United States Patent [19]

Fong et al.

[11] Patent Number: 5,035,806

[45] Date of Patent: Jul. 30, 1991

[54] SCALING SALT THRESHOLD INHIBITION AND DISPERSION WITH HYDROPHILIC/HYDROPHOBIC POLYMERS

[75] Inventors: Dodd W. Fong, Naperville; John E. Hoots, St. Charles, both of Ill.

[73] Assignee: Nalco Chemical Company, Naperville, Ill.

[21] Appl. No.: 590,334

[22] Filed: Sep. 28, 1990

Related U.S. Application Data

[63] Continuation of Ser. No. 351,827, May 15, 1989, abandoned.

[51] Int. Cl.$^5$ .................................................. C02F 5/12
[52] U.S. Cl. ...................................... 210/701; 252/180
[58] Field of Search .............................. 210/698–701; 252/180, 181

[56] References Cited

U.S. PATENT DOCUMENTS

| | | | |
|---|---|---|---|
| 3,709,815 | 1/1973 | Boothe et al. | 210/701 |
| 3,709,816 | 1/1973 | Walker et al. | 210/701 |
| 3,806,367 | 4/1974 | Lange et al. | 134/3 |
| 3,928,196 | 12/1975 | Persinski et al. | 210/701 |
| 4,536,292 | 8/1985 | Matz | 210/701 |
| 4,566,973 | 1/1986 | Masler et al. | 210/701 |
| 4,640,793 | 2/1987 | Persinski et al. | 252/82 |
| 4,703,092 | 10/1987 | Fong | 525/351 |
| 4,707,271 | 1/1987 | Amjad et al. | 210/701 |
| 4,711,725 | 12/1987 | Amick et al. | 210/701 |
| 4,752,443 | 6/1988 | Hoots et al. | 422/13 |
| 4,756,881 | 7/1988 | Hoots et al. | 422/13 |
| 4,784,774 | 11/1988 | Amjad et al. | 210/699 |
| 4,801,388 | 1/1989 | Fong et al. | 210/701 |
| 4,963,267 | 10/1990 | Hoots et al. | 210/701 |

FOREIGN PATENT DOCUMENTS

| | | |
|---|---|---|
| 86115026.6 | 5/1987 | European Pat. Off. |
| 87116647.6 | 5/1988 | European Pat. Off. |
| 187489 | 5/1985 | Japan |
| 187491 | 5/1985 | Japan |

*Primary Examiner*—Peter Hruskoci
*Attorney, Agent, or Firm*—Joan I. Norek; Robert A. Miller; Donald G. Epple

[57] ABSTRACT

The accumulation of scaling salt deposits in industrial water systems is reduced by adding to the water thereof at least an effective amount of a water soluble polymer comprised of units having pendant carboxylate groups, N-substituted sulfoalkyl amide groups, and N-substituted alkyl amide groups.

8 Claims, No Drawings

SCALING SALT THRESHOLD INHIBITION AND DISPERSION WITH HYDROPHILIC/HYDROPHOBIC POLYMERS

This is a continuation of copending application U.S. Ser. No. 07/351,827 filed on 05/15/89 now abandoned.

TECHNICAL FIELD OF THE INVENTION

The present invention is in the technical field of water treatment, particularly industrial water treatment, and more specifically, the present invention is in the technical field of reducing or eliminating the accumulation of scaling salt deposits in industrial water systems, particularly cooling water systems.

BACKGROUND OF THE INVENTION

In aqueous systems, particularly industrial water systems such as cooling water systems, the accumulation of deposits on the internal surfaces of the equipment, pipes, and the like may interfere with water flow, accelerate corrosion of metal parts, reduce heat transfer, and lead to other undesirable problems. Such deposits include deposits of scaling salts that form and precipitate under various conditions in the aqueous environment, including the type and amount of anions and cations present, pH, temperature, and the like. A water treatment agent that is active as a threshold inhibitor and/or dispersant for scaling salts, that is effective at low dosage levels, and that is stable under the environmental conditions found in industrial water systems, particularly cooling water systems, is extremely desirable, particularly if such agent is effective as both a threshold inhibitor and dispersant, and is effective for reducing deposit accumulations of various scaling salts.

DISCLOSURE OF THE INVENTION

The present invention provides a method for reducing the accumulation of scaling salt deposits in industrial water systems, particularly cooling water systems, by adding to the water of such system at least an effective amount of a certain water soluble polymer, described below, that is a threshold inhibitor and/or dispersant for scaling salts, and in preferred embodiment is both a threshold inhibitor and dispersant. Such polymer may be conveniently prepared by polymerization of certain ethylenically-unsaturated monomers, by conventional polymerization techniques, and then post-polymerization derivatization to obtain the polymer of the present invention as described in detail below. The polymer is characterized by the presence of three distinct types of mer units (polymer units derived from ethylenically-unsaturated monomers, which units are comprised of two adjacent polymer-backbone carbons and the various, distinguishing pendant groups). Such mer units may be designated as follows: carboxylate units, having a pendant carboxylic acid or water-soluble salt thereof group; N-substituted sulfoalkyl amide units, having a pendant amide group, the nitrogen of which is further substituted with a sulfoalkyl group; and N-substituted alkyl amide groups, having a pendant amide group the nitrogen of which is further substituted with alkyl. This polymer, which may be a random polymer, and which has significant hydrophilic and hydrophobic groups, may be characterized as a mixed hydrophilic/hydrophobic polymer. This polymer has been found effective as a threshold inhibitor and dispersant for scaling salts at very low dosage concentrations in industrial water system environments, particularly cooling water system environments, as discussed more fully below. As noted above, the polymer may be a random polymer, but the present invention does not exclude the use of block polymers or other more structured polymers which may be prepared by methods known to those of ordinary skill in the art.

PREFERRED EMBODIMENTS OF THE INVENTION

The polymer of the present invention is effective, at low dosage levels, in the threshold inhibition and/or dispersion of scaling salts under environmental conditions often encountered in industrial water systems, particularly industrial cooling water systems, and at least in preferred embodiment is effective in both the threshold inhibition and dispersion of scaling salts. Certain problematic scaling salts and the effectiveness of the polymer in reducing deposits accumulations thereof are discussed below.

One of the undesirable deposits that may form and accumulate in aqueous systems, particularly industrial cooling water systems, are deposits of insoluble iron compounds that are derived from soluble iron present in the waters of such systems. Soluble iron may be introduced into an aqueous system by its presence in the feed or source water or in other ways. Soluble iron is generally believed to be iron in the form of its ferrous ion, which is in its second oxidation state, as $Fe^{+2}$, and is often referred to as "iron (II)". Soluble iron, as this term is used herein, includes ferrous ions and any other form of iron that may be dissolved or soluble in a given water system. The presence of soluble iron in a water system may result in the formation and precipitation of insoluble iron oxides and iron hydroxides in situ when the aqueous environment becomes more oxidative than that of the soluble iron containing source or feed water or the like. An aqueous environment often becomes more oxidative by virtue of an increase in $O_2$ content and pH, for instance from a pH of less than 7.0, which is typical for source waters commonly employed in industrial aqueous systems, to a pH of greater than 7.0, and often to a pH of 8.0 or higher, wherein some oxygen is present in the waters. Such a change in pH can occur when the waters containing the soluble iron are admixed with water of a greater pH or are subjected to pH-increasing water treatments. An aqueous environment can also become more oxidative by the introduction of a chemical oxidizing agent which also may result in the formation of insoluble iron oxides and iron hydroxides as the oxidizing effect of such agent acts upon the soluble iron. It is believed that such insoluble iron oxides and iron hydroxides are mainly ferric oxide and ferric hydroxide, although the presence of some ferrous species in such precipitate is possible. The iron of ferric oxide and ferric hydroxide is in its oxidation state of three and is often referred to as "iron (III)". For the broad purpose of the present invention, which is the prevention of deposits of scaling salts in aqueous systems, the relative proportion of precipitate formed from soluble iron between ferric oxide and ferric hydroxide and the presence of other iron salts in such precipitate is not important, and such precipitate, regardless of its composition, will be referred to hereinafter as "iron (hydr)oxide" or "Fe (hydr)oxide".

Manganese ions may be present in cooling water systems because of introduction in feed or makeup water, or addition to a system as part of a corrosion inhibition treatment. As demonstrated below, the hydrophilic/hydrophobic polymers of the present invention have been shown effective in inhibiting iron (hydr)oxide in the presence of manganese ions.

In industrial water systems, particularly cooling water systems, water-soluble phosphonates (organophosphonates) are often added to the system as corrosion inhibitors. The term "phosphonate" as used herein refers to organic materials containing one or more $-PO_3H_2$ groups and salts thereof. The phosphonates most frequently added to systems for corrosion inhibition purposes include 1-hydroxy-1,1-ethane diphosphonic acid (HEDP), amino-tris-methylenephosphonic acid (AMP), and 2-phosphonobutane-1,2,4-tricarboxylic acid, although other water-soluble phosphonates are capable of providing corrosion inhibition and thus may be found in an industrial water system. See U.S. Pat. No. 4,303,568 which lists a number of representative phosphonates; the disclosure is incorporated herein by reference.

Orthophosphate is almost universally present in industrial water systems. Orthophosphate may be a component of the feed or makeup water, arise from decomposition of phosphonate corrosion inhibitors, or occur from leaching of deposits within the system. Orthophosphates, and at times other phosphates such as pyrophosphate, tripolyphosphate, hexametaphosphate, and higher molecular weight polyphosphate oligomers, may also be added to the water system for corrosion inhibition purposes.

Regardless of the desirability of phosphonates, and at times phosphates, for the purpose of forming a thin, oxygen-impermeable barrier film, gross scaling of insoluble calcium, and possibly magnesium, salts of phosphonates and phosphates is a water system management problem, particularly in industrial water systems, and prevention of such gross scaling is a serious industrial need.

The hydrophilic/hydrophobic polymer of the present invention, as demonstrated below, stabilizes iron (hydr)oxide, even in the presence of manganese, as shown by the high percentage of iron retained in the upper portion of a test solution under conditions where, without such a dispersant, most of the iron originally in such test solution would have settled out. Also as shown below, the hydrophilic/hydrophobic polymer of the present invention inhibits calcium phosphate and calcium phosphonate under conditions where, without such inhibitor, most of the phosphate or phosphonate would have precipitated and been removed from the test solution during the filtration step of the test procedure.

The hydrophilic/hydrophobic polymer of the invention is comprised of mer units of Formulas I, II, and III as follows:

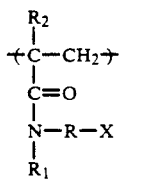
Formula I wherein $R_2$ is hydrogen or methyl, $R_1$ is hydrogen or alkyl, R is alkylene or phenylene, and X is sulfonate or hydroxy lower alkyl sulfonate;

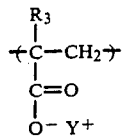
Formula II wherein $R_3$ is hydrogen or methyl and Y is hydrogen or an alkali metal, alkaline earth metal, or ammonium cation; and

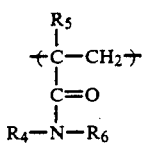
Formula III wherein $R_5$ is hydrogen or methyl, and $R_4$ and $R_6$ are independently hydrogen or alkyl provided that together they are comprised of from 2 to 10 carbon atoms.

The hydrophilic/hydrophobic polymer is comprised of the above-defined mer units in the amounts, in terms of mole percentage ranges, as set forth in Table A below:

TABLE A

| Mer Unit | Mole Percent Range | |
| Formula | Generally | Preferred |
| --- | --- | --- |
| Formula I | 2 to 60 | 5 to 30 |
| Formula II | 20 to 95 | 40 to 90 |
| Formula III | 2 to 60 | 5 to 30 |

The polymer, in preferred embodiment, has a molecular weight of from 1,000 to 80,000. In more preferred embodiment, the polymer has a molecular weight of from 5,000 to 50,000, and most preferred from 5,000 to 30,000.

The mer units of Formula II are either acrylic acid or methacrylic acid, alkali, or alkaline earth, metal or ammonia salts thereof, and combinations thereof. In preferred embodiment, the polymer is comprised of no more than from 0 to 45 mole percent of mer units of Formula II wherein $R_3$ is methyl (methacrylic acid or salts), and in more preferred embodiment the polymer is comprised of from 5 to 30 mole percent of mer units of Formula II wherein $R_3$ is methyl.

Another preferred species of polymer contains from 5 to 30 mole percent of sulfoethylacrylamide, from 5 to 30 mole percent t-butylacrylamide (t-Bu AcAm), and from 40 to 90 mole percent (meth)acrylic acid or salts thereof, particularly those polymers having a molecular weight of from 5,000 to 50,000 and wherein the polymers contain from 0 to 45 mole percent of methacrylic acid and salts thereof, the remainder of the (meth)acrylic acid being acrylic acid or salts thereof.

Another preferred species of polymer contains from 5 to 30 mole percent of 2-hydroxy-3-sulfopropylacrylamide, from 5 to 30 mole percent of t-Bu AcAm, and from 40 to 90 mole percent (meth)acrylic acid or salts thereof, particularly those polymers having a molecular weight of from 5,000 to 50,000 and wherein the polymers contain from 0 to 45 mole percent of methacrylic acid and salts thereof, the remainder of the (meth)acrylic acid being acrylic acid or salts thereof.

Another preferred species of polymer has a molecular weight of from 5,000 to 30,000, and contains from 5 to 30 mole percent of a unit of Formula I selected from sulfomethylacrylamide, sulfoethylacrylamide, and 2-hydroxy-3-sulfopropylacrylamide, from 5 to 30 mole percent of t-Bu AcAm, and from 40 to 90 mole percent (meth)acrylic acid or salts thereof, wherein the polymers contain from 5 to 30 mole percent methacrylic acid and salts thereof, the remainder of the (meth)acrylic acid being acrylic acid and salts thereof.

Particularly advantageous polymers for the present invention are those containing sulfomethylacrylamide (AMS), sulfoethylacrylamide (AES), sulfopropyl- and 2-hydroxy-3-sulfopropylacrylamide units, that is wherein, in Formula I, $R_1$ is hydrogen and R is methylene, ethylene, propylene, or 2-hydroxypropylene, or combinations thereof.

Also particularly advantageous polymers are those containing t-butyl acrylamide (t-Bu AcAm), isopropyl acrylamide (i-Pr AcAm), isobutyl acrylamide (i-Bu AcAm), dimethyl acrylamide (diMe AcAm), diethyl acrylamide (diEt AcAm), or methyl ethyl acrylamide (MeEt AcAm), or combinations thereof, that is wherein, in Formula III, one of $R_4$ and $R_6$ is hydrogen while the other is a branched alkyl having 3 to 4 carbon atoms, or wherein both of $R_4$ and $R_6$ are alkyl each having from 1 to 2 carbon atoms.

A preferred species of polymer contains from 5 to 30 mole percent of sulfomethylacrylamide, from 5 to 30 mole percent t-butyl acrylamide, and from 40 to 90 mole percent (meth)acrylic acid or salts thereof, particularly those polymers having a molecular weight of from 5,000 to 30,000 and wherein the polymers contain from 0 to 45 mole percent of methacrylic acid and salts thereof, the remainder of the (meth)acrylic acid being acrylic acid or salts thereof.

The polymer of the present invention may contain up to 10 mole percent of mer units other than those defined by one of Formulas I, II, and III above, provided that such other mer unit(s) does not interfere with, or inhibit, the effectiveness of the polymer as threshold inhibitors and dispersants of scaling salts in industrial water systems, which is derived from the presence of each of the mer units of Formulas I, II, and III, and the balance between such mer units.

The polymer of the present invention is water soluble and is used at a dosage concentration of at least 0.1 ppm. In preferred embodiment, a reasonable minimum dosage is a dosage concentration of at least 1.0 ppm. Although an excess of the polymer in any amount may be used, a practical dosage range is from 1.0 to 100.0 ppm polymer, and in preferred embodiment from 1.0 to 50.0 ppm.

The above abbreviations for various mer units are used in the following examples and tables, and in addition the abbreviations "AA" for acrylic acid, "MAA" for methacrylic acid, and "AcAm" for acrylamide such as in "sulfoalkyl AcAm" are used in the following examples and tables.

EXAMPLES 1 TO 3

Three hydrophilic/hydrophobic polymers of the present invention were prepared by sulfomethylamidation of an acrylic acid/methacrylic acid/t-butyl acrylamide terpolymer as follows. The terpolymer used had a molecular weight of 14,500, and mole percentages of mer units as follows: 68 mole percent of acrylic acid units; 19 mole percent of methacrylic acid units; and 13 mole percent of t-butyl acrylamide units. In each sulfomethylamidation procedure, the terpolymer (46.5 wt. percent actives in water) was admixed with hydroxymethylsulfonate (sodium salt) and ammonium hydroxide (29 wt. percent as $NH_3$), and was heated in a mini Parr pressure reactor, maintained at a temperature of 150° C., for a period of six hours, after which the composition of the resultant polymer as to the level of $SO_3^-$ incorporated thereinto by conversion of a portion of the acrylic acid units to sulfomethyl acrylamide units was determined by colloid titration. In Table I below, the charges of the various reactants and the characteristics of the resultant polymers are set forth for each of Examples 1 to 3.

TABLE I

|  | Example 1 | Example 2 | Example 3 |
|---|---|---|---|
| Reactant Charge (in grams) |  |  |  |
| Terpolymer (actives) | 62.78 | 55.8 | 51.15 |
| $HOCH_2SO_3Na$ (actives) | 20.57 | 27.42 | 33.52 |
| $NH_3$ (as $NH_3$) | 2.61 | 3.48 | 4.25 |
| Resultant Polymer Characteristics |  |  |  |
| Mole % AA units | 60 | 55 | 50 |
| Mole % MAA units | 19 | 19 | 19 |
| Mole % t-BuAcAm units | 13 | 13 | 13 |
| Mole % AMS units | 8 | 13 | 18 |
| Molecular Weight | 14,300 | 14,400 | 14,400 |
| Actives | 41.1 | 39.6 | 38.3 |

The polymer of the present invention in embodiment having N-substituted sulfoalkyl amide units other than the sulfomethyl- units of Examples 1 to 3 may be similarly prepared by selecting commensurate reactants for the aminomethane sulfonic acid ($NH_3$ and $HOCH_2SO_3Na$) above, such as 2-aminoethanesulfonic acid (taurine), 1-amino-2-hydroxy-3-propanesulfonic acid, 2,3-dihydroxypropyl amine, 4-aminobenzenesulfonic acid (p-sulfanilic acid), and the like.

In the following Examples 4 through 18 various "beaker" tests were conducted to demonstrate the effectiveness of the hydrophilic/hydrophobic polymers of the present invention as threshold inhibitors and dispersants of scaling salts in water systems, such as cooling water systems, which generally are oxygenated waters wherein elevated pH conditions, such as pH's of 8 or higher, often exist. The test solutions prepared for all of these Examples were prepared by adding various substances, described in each Example, to deionized water. The amounts of each substance added is generally expressed in terms of concentration level in "ppm" (parts per million by weight). During each test's duration, the test solutions were held in glass vessels immersed in a constant-temperature bath so as to maintain the temperature condition of the test. To maintain the pH condition of the tests, the pH of the test solutions were manually adjusted at 15 minute intervals during the first hour and at 1 hour intervals subsequently. For each individual test the volume of the test solutions were the same to avoid any test variation(s) that could be attributable to the size of the test solution. Where aliquots of the test solutions are filtered prior to analysis, a cellulose acetate/nitrate Millipore filter (type HA, 0.45 μm) filter was used.

EXAMPLES 4 TO 6

Tests and comparative tests were performed to demonstrate the effectiveness of the polymers of the present invention in stabilizing iron (hydr)oxide that otherwise would form and precipitate in situ under conditions simulating the conditions often encountered in industrial cooling water systems. Five test solutions were prepared, designated Examples 4, 5, and 6 and Comparative Examples (a) and (b), each of which contained 10 ppm of soluble iron ($Fe^{+2}$) (as Fe), a level of calcium and magnesium ions that is commonly found in industrial cooling water systems, 2 ppm $Mn^{+2}$ ions (as Mn), and 10 ppm of polymer actives, the particular polymer for each test solution being identified below. These test solutions as prepared each had a pH of less than 4.0. Each test solution was then dosed with a certain base to raise the pH to a certain level above pH 8.5, maintained at a certain elevated temperature (60° C.) for a 24 hour period of time, and then allowed to cool and sit undisturbed, without agitation, for a 24 hour time period, after which an unfiltered sample from each test solution was withdrawn from the upper portion thereof. Such samples were each analyzed by atomic absorption spectroscopy to determine the iron concentration therein. The percentage of stabilization of iron (hydr)oxide, also referred to as Fe (Hydr)oxide, was determined for each test solution by the following calculation: the iron concentration level, in ppm, found in each respective withdrawn sample was divided by the initial iron concentration in the test solution (10 ppm for all test solutions), and then multiplied by 100. All five test solutions were subjected to identical test parameters, except as to the polymer specie tested. A test solution containing no polymer would, if identically processed, have such a low level of iron in a sample withdrawn from the upper portion that an adjustment in the above calculation in view of such "blank" test results would not be meaningful. The polymers tested in Examples 4, 5 and 6 were respectively the polymers prepared as described in Examples 1, 2 and 3 above. In Comparative Example (a) the polymer tested was a sample of the AA/MAA/t-BuAcAm terpolymer starting material of Examples 1 to 3. In Comparative Example (b) the polymer tested was prepared by the same method as those of Examples 1 to 3 but with a lower charge of hydroxymethylsulfonate and ammonium hydroxide, which provided a polymer containing only three mole percent of sulfomethylacrylamide units. The percentages of Fe (Hydr)oxide stabilizations for each test solution and the polymer characteristics are set forth below in Table II.

TABLE II

| Example or Comparative Example Designation | Polymer Characteristics | | | | | |
|---|---|---|---|---|---|---|
| | Mole Percent Mer Units | | | | | |
| | AA | sulfo-alkyl AcAm | MAA | t-Bu AcAm | Molecular Weight | Percent Iron (Hydr)oxide Stabilization |
| (a) | 68 | 0 | 19 | 13 | 14,100 | 23 |
| (b) | 65 | 3 | 19 | 13 | 14,200 | 8 |
| 4 | 60 | 8 | 19 | 13 | 14,300 | 95 |
| 5 | 55 | 13 | 19 | 13 | 14,400 | 97 |
| 6 | 50 | 18 | 19 | 13 | 14,400 | 96 |

EXAMPLES 7 TO 9

The test described for Examples 4 to 6 above was repeated for the same test polymers except that the test solutions did not contain manganese. The percentage of stabilization of iron was determined in the same manner, and the test results and polymer characteristics are set forth below in Table III.

TABLE III

| Example or Comparative Example Designation | Polymer Characteristics | | | | | |
|---|---|---|---|---|---|---|
| | Mole Percent Mer Units | | | | | |
| | AA | sulfo-alkyl AcAm | MAA | t-Bu AcAm | Molecular Weight | Percent Iron (Hydr)oxide Stabilization |
| (c) | 68 | 0 | 19 | 13 | 14,100 | 20 |
| (d) | 65 | 3 | 19 | 13 | 14,200 | 20 |
| 7 | 60 | 8 | 19 | 13 | 14,300 | 22 |
| 8 | 55 | 13 | 19 | 13 | 14,400 | 95 |
| 9 | 50 | 18 | 19 | 13 | 14,000 | 96 |

EXAMPLES 10 TO 12

Tests and comparative tests were performed to demonstrate the effectiveness of the polymers of the present invention in inhibiting the formation of insoluble calcium phosphate salt formation under conditions simulating the conditions often encountered in industrial cooling water systems. Five test solutions were prepared containing 250 ppm $Ca^{+2}$ (from $CaCl_2.4H_2O$) (as $CaCO_3$), 125 ppm $Mg^{+2}$ (from $MgSO_4.7H_2O$) (as $CaCO_3$), 10 ppm $PO_4^{-3}$ (from $H_3PO_4$), and 10 ppm of polymer actives, the particular polymer for each test solution being identified below. The temperature of each test solution was raised to 70° C. and, using dilute aqueous NaOH, the pH was raised to 8.5, and such temperature and pH for each test solution was maintained for a 4 hour duration, after which part of each test solution was filtered through a 0.45 um micropore filter, and the orthophosphate concentration of a filtered and an unfiltered sample of each test solution was determined spectrophotometrically (700 nm). The percentage of calcium phosphate inhibition was determined for each test solution by the following Equation 1:

$$\% \text{ inhibition} = \frac{(\text{filtered} - \text{blank})}{(\text{unfiltered} - \text{blank})} \times 100 \qquad \text{(Eq 1)}$$

where "filtered" is the concentration of phosphorus (as $PO_4$) in the filtered aliquot of the test solution, "unfiltered" is the concentration of phosphorus (as $PO_4$) in the unfiltered aliquot of the test solution, and "blank" is the concentration of phosphorus (as $PO_4$) in filtrate in the absence of any inhibitor for a test solution subjected to the same test conditions. The polymers tested in Examples 10, 11, and 12 were respectively the polymers prepared as described in Examples 1, 2 and 3 set forth above. The polymer tested in Comparative Example (e) was the same AA/MAA/t-BuAcAm terpolymer tested in Comparative Examples (a) and (c), and similarly the polymer tested in Comparative Example (f) was the same three mole percent sulfomethylacrylamide containing polymer tested in Comparative Examples (b) and (d) above. The percentages of calcium phosphate inhibition and the polymer characteristics are set forth below in Table IV.

The polymer of Comparative Example (e) was also tested at a 50 percent higher concentration level, that is at 15 ppm based on polymer actives, and at such level its calcium phosphate inhibition was determined to be 91 percent.

Although the determination here is referred to as calcium phosphate inhibition, the presence of magnesium at a level of 125 ppm in the test solutions provides a situation wherein magnesium phosphate could also be formed.

EXAMPLES 16 TO 18

Tests and comparative tests were performed to demonstrate the effectiveness of the polymers of the present invention in inhibiting the formation of calcium phosphonate scale under conditions simulating that found in industrial cooling water systems. Ten test solutions were prepared containing 360 ppm $Ca^{+2}$ (as $CaCO_3$), HEDP in an amount to provide 5.6 ppm phosphorus (as $PO_4$), PBTC in an amount to provide 8 ppm phosphorus (as $PO_4$), and either 7.5 or 10 ppm of polymer actives, the particular polymer and amount thereof for each test solution being identified below and in Table VI. The temperature of each test solution was raised to 60° C. and, using dilute aqueous NaOH, the pH was raised to 9.2, and such temperature and pH for each test solution was maintained for a 4 hour duration, after which an aliquot of each test solution was filtered through a 0.45 um Millipore filter, and the phosphorus concentration of the filtered and an unfilter aliquot of each test solution was determined by spectophotometrically. The percentage of calcium phosphonate inhibition was determined for each test solution using Equation 1 as described above in Examples 10 to 12, using a standard value for the blank of 3.5 ppm total phosphorus. The polymers tested in Examples 16, 17, and 18 were respectively the polymers prepared as described in Examples 1, 2 and 3 above. The polymer tested in Comparative Example (i) was the AA/MAA/t-BuAcAm terpolymer tested in Comparative Examples (a), (c), (e), and (g), and similarly the polymer tested in Comparative Example (j) was the 3 mole percent sulfomethylacrylamide containing polymer tested in Comparative Examples (b), (d), (f) and (h) above. Each polymer was tested at both the 7.5 and 10 ppm actives levels. The percentages of calcium phosphonate inhibition and the polymer characteristics are set forth below in Table VI.

TABLE IV

| Example or Comparative Example Designation | Polymer Characteristics | | | | | Percent Calcium Phosphate Inhibition |
|---|---|---|---|---|---|---|
| | Mole Percent Mer Units | | | | Molecular Weight | |
| | AA | sulfo-alkyl AcAm | MAA | t-Bu AcAm | | |
| (e) | 68 | 0 | 19 | 13 | 14,100 | 24 |
| (f) | 65 | 3 | 19 | 13 | 14,200 | 8 |
| 10 | 60 | 8 | 19 | 13 | 14,300 | 89 |
| 11 | 55 | 13 | 19 | 13 | 14,400 | 95 |
| 12 | 50 | 18 | 19 | 13 | 14,000 | 98 |

EXAMPLES 13 TO 15

The test described in Examples 10 to 12 above was repeated for the same test polymers except that the test solutions further included 3 ppm of $Fe^{+2}$ (as Fe) and the polymers were tested each at a concentration of 15 ppm polymer actives in the test solution. The percentages of calcium phosphate inhibition determined and the polymer characteristics are set forth below in Table V. The presence of $Fe^{+2}$ increases the difficulty of the test procedure over that of Examples 10 to 12, and for this reason a higher concentration level of polymer actives was tested.

TABLE V

| Example or Comparative Example Designation | Polymer Characteristics | | | | | Percent Calcium Phosphate Inhibition |
|---|---|---|---|---|---|---|
| | Mole Percent Mer Units | | | | Molecular Weight | |
| | AA | sulfo-alkyl AcAm | MAA | t-Bu AcAm | | |
| (g) | 68 | 0 | 19 | 13 | 14,100 | 4 |
| (h) | 65 | 3 | 19 | 13 | 14,200 | 4 |
| 13 | 60 | 8 | 19 | 13 | 14,300 | 50 |
| 14 | 55 | 13 | 19 | 13 | 14,400 | 65 |
| 15 | 50 | 18 | 19 | 13 | 14,000 | 86 |

TABLE VI

| Example or Comparative Example Designation | Polymer Characteristics | | | | | Percent Calcium Phosphonate Inhibition | |
|---|---|---|---|---|---|---|---|
| | Mole Percent Mer Units | | | | | | |
| | AA | sulfo-alkyl AcAm | MAA | t-Bu AcAm | Molecular Weight | 7.5 ppm Polymer Actives | 10 ppm Polymer Actives |
| (i) | 68 | 0 | 19 | 13 | 14,100 | 85 | 81 |
| (j) | 65 | 3 | 19 | 13 | 14,200 | 1 | 1 |
| 16 | 60 | 8 | 19 | 13 | 14,300 | 13 | 87 |
| 17 | 55 | 13 | 19 | 13 | 14,400 | 88 | 93 |
| 18 | 50 | 18 | 19 | 13 | 14,000 | 92 | 93 |

INDUSTRIAL APPLICABILITY OF THE INVENTION

The present invention is applicable to industrial water systems, such as industrial cooling water systems and the like.

We claim:

1. A method of reducing the accumulation of calcium phosphonate deposits in an industrial water system that contains soluble ions of at least one species that normally forms calcium phosphonate deposits in a pH environment of a pH greater than 7.0, comprising:
   adding to the water of said industrial water system at least an amount of a water soluble polymer effective for calcium phosphonate deposit reduction, said polymer comprised of mer units of Formulas I, II, and III, wherein:

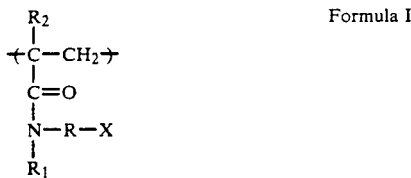

Formula I wherein $R_2$ is hydrogen or methyl, $R_1$ is hydrogen, R is methylene, and X is sulfonate;

Formula II wherein $R_3$ is hydrogen or methyl, and Y is hydrogen or an alkali metal, alkaline earth metal, or ammonium cation; and

Formula III wherein $R_5$ is hydrogen or methyl, $R_4$ is hydrogen and $R_6$ is t-butyl;
wherein said polymer is comprised of from about 10 to about 25 mole percent of said units of said Formula I, from about 55 to about 85 mole percent of said units of said Formula II, and from about 5 to about 20 mole percent of said units of said Formula III, and has a molecular weight of from about 3,000 to about 50,000 wherein said units of Formula II are comprised of from 5 to 30 mole percent methacrylic acid and salts thereof, and the remainder of said units of Formula II being acrylic acid and salts thereof.

2. The method of claim 1 wherein said polymer is comprised of from 10 to 25 mole percent of sulfomethylacrylamide, from 5 to 20 mole percent of t-butylacrylamide, and from 55 to 85 mole percent of (meth)acrylic acid or alkali metal, alkaline earth metal or ammonium salts thereof.

3. The method of claim 1 wherein said polymer has a molecular weight of from 5,000 to 30,000.

4. The method of claim 3 wherein said units of said Formula III are t-butylacrylamide.

5. The method of claim 1 wherein said polymer is added to said water in a dosage amount of at least 1.0 ppm.

6. The method of claim 5 wherein said polymer is added to said water in a dosage amount of from 1.0 to 100.0 ppm.

7. The method of claim 6 wherein said polymer is added to said water in a dosage amount of from 1.0 to 50.0 ppm.

8. A method of reducing the accumulation of calcium phosphonate deposits in an industrial water system that contains soluble ions of at least one species that normally forms calcium phosphonate deposits in a pH environment of a pH of 8.0 or greater, comprising:
   adding to the water of said industrial water system at least 0.1 ppm of a water soluble polymer comprised of mer units of Formulas I, II and III, wherein:

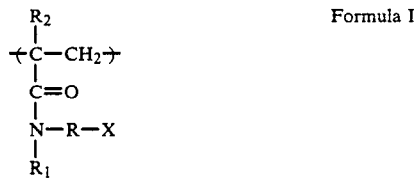

Formula I wherein $R_1$ and $R_2$ are each hydrogen, R is methylene, and X is sulfonate;

Formula II wherein $R_3$ is hydrogen or methyl and Y is hydrogen or an alkali metal, alkaline earth metal or ammonium cation; and

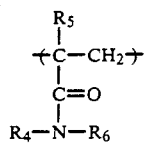

Formula III wherein R<sub>4</sub> and R<sub>5</sub> are each hydrogen and R<sub>6</sub> is a t-butyl radical;

wherein said polymer is comprised of from about 10 to about 25 mole percent of said units of said Formula I, from about 55 to about 85 mole percent of said units of said Formula II, and from about 10 to about 20 mole percent of said units of said Formula III, and has a molecular weight of from about 3,000 to about 30,000 wherein said units of Formula II are comprised of from 5 to 30 mole percent methacrylic acid and salts thereof, and the remainder of said units of Formula II being acrylic acid and salts thereof.

* * * * *

UNITED STATES PATENT AND TRADEMARK OFFICE
CERTIFICATE OF CORRECTION

PATENT NO. : 5,035,806

DATED : Jul. 30, 1991

INVENTOR(S) : Dodd W. Fong and John E. Hoots

It is certified that error appears in the above-identified patent and that said Letters Patent is hereby corrected as shown below:

At column 7, line 24, delete "24" and substitute therefor -- 2 --.

Signed and Sealed this

Fifteenth Day of December, 1992

Attest:

DOUGLAS B. COMER

*Attesting Officer*      *Acting Commissioner of Patents and Trademarks*